United States Patent [19]

Horiba et al.

[11] Patent Number: 4,493,878

[45] Date of Patent: Jan. 15, 1985

[54] FUEL ELEMENT FOR LIQUID FUEL CELL AND A LIQUID FUEL CELL

[75] Inventors: Tatsuo Horiba; Kazuo Iwamoto; Hidejiro Kawana, all of Hitachi; Kazunori Fujita, Tohkai; Kohki Tamura, Hitachi, all of Japan

[73] Assignee: Hitachi, Ltd., Tokyo, Japan

[21] Appl. No.: 482,723

[22] Filed: Apr. 7, 1983

[30] Foreign Application Priority Data

Apr. 23, 1982 [JP] Japan ................................ 57-67416

[51] Int. Cl.³ ........................ H01M 6/36; H01M 8/04
[52] U.S. Cl. ........................................ 429/12; 429/19; 429/20; 429/101; 429/118
[58] Field of Search ...................... 429/19, 20, 21, 12, 429/101, 110, 118

[56] References Cited

U.S. PATENT DOCUMENTS

| 3,098,769 | 7/1963 | Liebhafsky et al. | 429/19 |
| 3,444,002 | 5/1969 | Wijnen et al. | 429/118 |
| 3,540,485 | 11/1970 | Kummins | 429/19 |
| 4,155,712 | 5/1979 | Taschek | 429/19 |

Primary Examiner—Donald L. Walton
Attorney, Agent, or Firm—Antonelli, Terry & Wands

[57] ABSTRACT

This invention is a fuel element for liquid fuel cell characterized in that a liquid fuel is rendered to assume a non-fluidized state by either physical means or chemical means, and is returned back to the initial liquid fuel at any time by physical means or chemical means.

18 Claims, 5 Drawing Figures

FUEL ELEMENT FOR LIQUID FUEL CELL AND A LIQUID FUEL CELL

BACKGROUND OF THE INVENTION

1. Field of the Invention

The present invention relates to a fuel element for liquid fuel cell as well as to a liquid fuel cell which employs the fuel element.

2. Description of the Prior Art

According to a conventional fuel cell employing a liquid fuel such as methanol, a fuel tank is provided and the fuel is supplied from the fuel tank to the cell body by a pump or the like, as disclosed in Japanese Patent Publication No. 44777.1973. However, the pump and other auxiliary devices make it difficult to realize the fuel cell in a compact size in reduced weight. That is, the conventional fuel cell is not suited for being transported. Further, a serious problem arises with regard to preventing the leakage of liquid when the fuel cell is constructed in a portable design. In particular, complete air-tight construction is required when a reactive reagent is to be employed such as methanol or formalin, presenting a great problem from the standpoint of design and manufacture. Moreover, cumbersome operation is required to replenish the fuel. Therefore, the conventional fuel cell is not suited for use as a portable power source for ordinary people.

SUMMARY OF THE INVENTION

Objects of the Invention

A first object of the present invention therefore is to provide a fuel element of a quite novel type for liquid fuel cell, which can be detachably attached through a simple operation, and which eliminates the probability of leakage of fuel which pertains to a reactive reagent even when the fuel element is attached or detached.

Another object of the present invention is to provide a liquid fuel cell which features small size, reduced weight, as well as excellent portability, in addition to the above-mentioned advantage of easy handling.

Statement of the Invention

The fuel element for liquid fuel cell of the present invention is characterized in that a liquid fuel is rendered to assume a non-fluidized state by physical means or chemical means, and is returned back to the initial liquid fuel at any time by physical means or chemical means.

Examples of the liquid fuel employed for the present invention include methanol, formic acid, formalin, hydrazine and the like. To render the fuel to assume a non-fluidized state is to convert the liquid fuel into a solid matter or a paste-like matter under ordinary condition or to convert the liquid fuel into a paste-like matter that is not apparently solidified, by either physical means or chemical means without any external means. Conventional methods can be employed as physical or chemical means. For instance, a representative example may be to use an adsorbing agent. Examples of the adsorbing agent include dextrin, dextran, silica gel, silica, alumina, molecular Sieves, kaolin, diatomaceous earth, carbon black, activated carbon, and the like. Another method is a chemical one according to which formic acid is converted into sodium formate or potassium formate, hydrazine is converted into hydrazinium sulfate, methanol is chemically converted into lithium methylate, sodium methylate or potassium methylate, and formaldehyde is polymerized into metaformaldehyde or paraformaldehyde.

The fuel which is in the non-fluidized state can be returned back to the initial liquid fuel as mentioned below. When the fuel is adsorbed by dextrin, dextran, silica gel, silica, alumina, molecular Sieves, kaolin or diatomaceous earth, water should simply be added. When the fuel is adsorbed by carbon black or activated carbon, heat should be applied, or water should be added under heated condition. When the fuel exists in the form of sodium formate, potassium formate or hydrazinium sulfate, the fuel can be returned back to the liquid state by the hydrolysis. Or, when the fuel exists in the form of metaformaldehyde or a paraformaldehyde, it can be returned back to the initial liquid fuel by adding water under heated condition.

BRIEF DESCRIPTION OF THE DRAWINGS

The fuel element of the present invention can be conveniently used if it is wrapped in a paper, in a net-like substrate material, or in a fibrous substrate material such as woven fabric or nonwoven fabric, or if it is contained in a case (cartridge) of which a portion is made of the above-mentioned substrate material. FIG. 1 illustrates an example of the fuel element, in which reference numeral 1 denotes a fuel element which is under the nonfluidized state, 2 denotes a cartridge for accommodating the fuel element, 3 denotes a net-like substrate material (net) provided in a portion of the cartridge, and 4 denotes a flange formed in the upper portion of the cartridge. The thus constructed fuel element can be very easily fitted into the fuel cell, or can be removed therefrom very easily, eliminating the probability of leakage when it is attached or detached. Accordingly, the liquid fuel cell can be handled in a very simplified manner.

Figure 1:
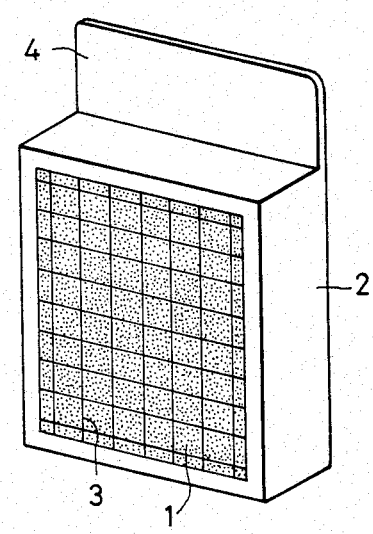
FIG. 1 is a perspective view of a fuel element according to an embodiment of the present invention.

Here, the fuel element 1 of FIG. 1 may be wrapped in the fibrous substrate material (not shown) before it is accommodated in the cartridge.

Figure 2:
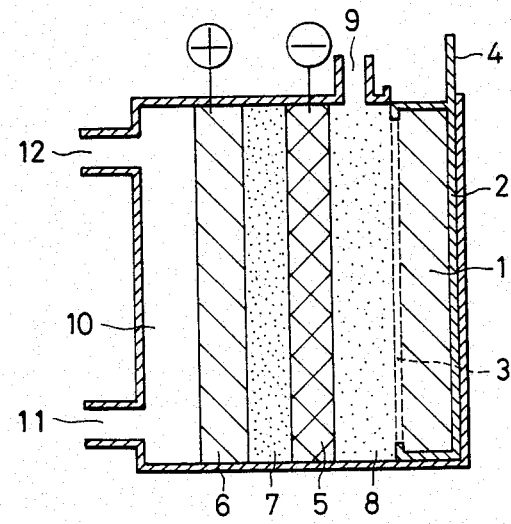
FIG. 2 is a section view illustrating construction of a fuel cell which is loaded with the fuel element.

The fuel element constructed in the form of a cartridge shown in FIG. 1, can be very easily attached to the fuel cell or detached therefrom. FIG. 2 illustrates the case when the above-mentioned cartridge is mounted on the fuel cell. Namely, FIG. 2 is a section view illustrating construction of the fuel cell, in which reference numeral 5 denotes an anode, 6 denotes a cathode, 7 denotes an electrolyte, 8 denotes a chamber containing anolyte or fuel, 9 denotes a port for exhausting gases such as carbon dioxide gas formed by the cell reaction, 10 denotes a chamber containing oxidizing agent such as air, 11 denotes a port for supplying the oxidizing agent, and 12 denotes an exhaust port for reaction product such as water. The chamber 8 for anolyte or fuel should preferably be filled with a fibrous substrate material such as glass wool or polypropylene fiber which has resistance against the electrolyte, so that the fuel which is returned back to the liquid state can be carried. This is also desirable from the standpoint of preventing the leakage.

The inventors have forwarded the study concerning means for adapting the fuel element to the fuel cell, and have realized the fuel cell which will be described below.

Namely, the inventors have accomplished a liquid fuel cell which contains an anode, a cathode, and an electrolyte which exists between said two electrodes, wherein a cartridge is detachably provided via means which prevents the electrolyte from flowing back into the cartridge, and a fuel element is contained in said cartridge, said fuel element being allowed to return back to the initial liquid fuel by physical means or chemical means.

In using the fuel element of the cartridge type, what is a problem is how to prevent the leakage of the fuel at the time of attaching or detaching the cartridge. In order to solve this problem, the inventors have tried not to permit the reversal of flow of the electrolyte in the cell after the cartridge has been attached, and have contemplated the fuel cell in which the cartridge is attached to the cell body via means for preventing the reversal of flow.

Figure 3:
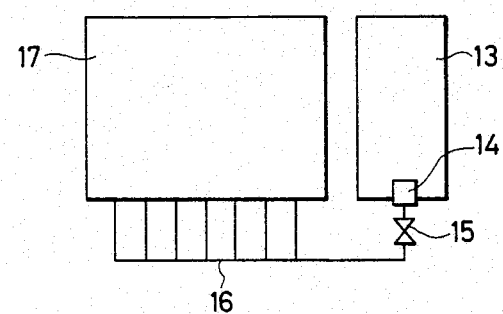
FIGS. 3 and 4 are diagrams schematically illustrating fuel cells of the laminated type according to other embodiments.
Figure 4:
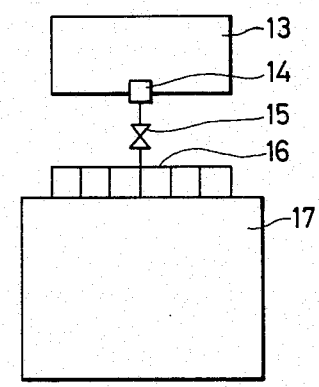

An embodiment of the fuel cell will be described below with reference to FIGS. 3 and 4, which schematically illustrate the case when the invention is adapted to a liquid fuel cell of the stacked type. In FIGS. 3 and 4, reference numeral 13 denotes a fuel vessel which accommodates a cartridge (not shown) and which has a port in the lower portion to supply the liquid fuel, 14 denotes a device for preventing the reversal of flow, i.e., check valve, 15 denotes a valve for supplying fuel, 16 denotes a manifold for supplying fuel, and 17 denotes a cell body of the stacked type. The fuel which is contained in the cartridge (not shown) accommodated in the vessel 13 and which is returned back to liquid by the above-mentioned method, is sent into the manifold 16 via the device 14 for preventing the reversal of flow and a valve 15, and is supplied into the anodes in the stacked cells. With the above-mentioned liquid fuel cell, the cartridge can be easily attached or detached to replenish the fuel or to renew it, without presenting the probability of leakage of electrolyte. Further, no pump is required to supply the fuel, and the liquid fuel cell can be constructed in a small size and in a reduced weight. Owing to the provision of the device for preventing the reversal of flow, furthermore, concentration of the electrolyte can be maintained constant. FIG. 3 illustrates the case when the fuel vessel 13 is provided at a horizontal position relative to the stacked cell body 17, and FIG. 4 illustrates the case when the fuel vessel 13 is provided above the stacked cell body 17. With the liquid fuel cell of the construction shown in FIG. 4, the fuel flows down smoothly being assisted by gravity.

Mentioned below are working examples in which fuel elements of the invention are prepared, and are practically used for the fuel cells.

EXAMPLES

Example 1

[Preparation of fuel element]

One part by weight of dextrin was dissolved in 5 parts by weight of distilled water, and to which was added 10 parts by weight of methanol. The thus obtained powder was introduced into a bag made of a nonwoven fabric of polypropylene. The powder in the bag was accommodated in a cartridge made of polypropylene (net was also made of polypropylene) shown in FIG. 1.

[Preparation of fuel cell]

A mixture consisting of 30 parts by weight of platinum black and 3.5 parts by weight of polytetrafluoroethylene was applied onto a wire gauze of platinum, and was baked in an nitrogen atmosphere at about 300° C. for 0.5 hour, to prepare an anode. Further, another mixture consisting of 30 parts by weight of platinum black and 7.5 parts by weight of polytetrafluoroethylene was applied onto a wire gauze of platinum, and a porous sheet (water-proof film) composed of polytetrafluoroethylene was superposed on one side of the wire gauze. The thus assembled electrode was compressed under a pressure of 300 kg/cm², and was baked in an nitrogen atmosphere at a temperature of 300° C. for 0.5 hour, to prepare a cathode. Then, using the thus prepared two electrodes, a fuel cell of the construction shown in FIG. 2 was prepared. A cation exchanger film (Nafion 425 produced by Du Pont Co.) was used as a separator, and was impregnated with a 1.5 mol/l of sulfuric acid aqueous solution that served as an electrolyte.

Figure 5:
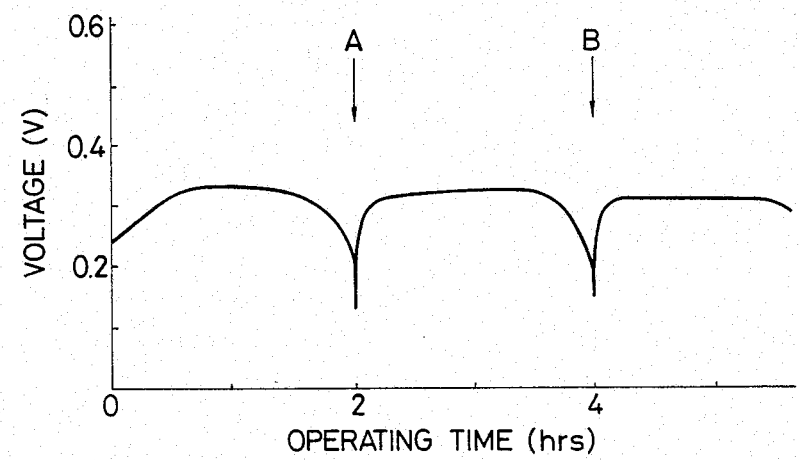
FIG. 5 is a graph showing discharge characteristics of the liquid fuel cell according to an embodiment of the present invention.

The above fuel cell was loaded with the fuel cartridge to produce electric power. Water was poured into the fuel cartridge in an amount twice the weight of methanol that had been contained in the fuel cartridge, and then the solid fuel in the cartridge was in contact with the water to become liquid fuel, so that the fuel was automatically supplied to the anode. Discharge characteristics of the cell were as shown in FIG. 5. The discharge current density was 40 m$^4$/cm$^2$, and the temperature was maintained at room temperature. The air was supplied by a blower. In FIG. 5, points A and B represents the moment at which the fuel element was renewed. It will be obvious from FIG. 5 that the fuel cell of the present invention is sufficiently practicable.

EXAMPLE 2

4 Parts by weight of a silica powder and 1 part by weight of methanol were mixed well. The mixture was wrapped in a filtering paper and was introduced into a bag made of a nonwoven fabric of polypropylene. The bag was then accommodated in the cartridge made of polypropylene shown in FIG. 1.

Using the thus obtained fuel element, a fuel cell was constructed in the same manner as in Example 1.

Two parts by weight of water was added into the cartridge of the fuel cell, and then the solid fuel was in contact with the water to become liquid fuel, so that the fuel was automatically supplied to the anode, thereby to operate the cell. Discharge characteristics of the cell were nearly the same as the characteristics shown in FIG. 5.

What is claimed is:

1. A fuel element for supplying liquid fuel to a fuel cell comprising: a non-fluid material binding a fuel in a non-fluidized state within an outer wrapping or cartridge, whereby the fuel element may be removably positioned within a fuel cell to provide liquid fuel to the fuel cell.

2. A liquid fuel cell according to claim 1, wherein the fuel element is wrapped in a fibrous substrate material is contained in said cartridge.

3. A fuel element according to claim 1, wherein said non-fluid material is a material that releases the fuel, to provide the liquid fuel, when coming into contact with water.

4. A fuel element according to claim 1, wherein said non-fluid material is an adsorbing agent.

5. A fuel element according to claim 1, wherein said non-fluid material is an agent which chemically reacts with the fuel to form salts thereof or polymers thereof that are in a solid form.

6. A liquid fuel cell comprising an anode, a cathode and an electrolyte positioned between the electrodes, said cell including an anolyte or fuel chamber connected with a means for holding a fuel supply element, the fuel element of claim 1 being removably positioned within said holding means, whereby the fuel may be converted to its liquid state and form the anolyte within the fuel cell.

7. A liquid fuel cell according to claim 6, wherein said means for holding a fuel supply element includes means for preventing flow of electrolyte to the means for holding a fuel supply element.

8. A liquid fuel cell according to claim 7, wherein said non-fluid material is an adsorbing agent.

9. A liquid fuel cell according to claim 7, wherein said non-fluid material is an agent which chemically reacts with the fuel to form salts thereof or polymers thereof that are in a solid form.

10. A liquid fuel cell according to claim 6, wherein said non-fluid material is an adsorbing agent.

11. A liquid fuel cell according to claim 10, wherein the adsorbing agent is selected from dextrin, dextran, silica gel, silica, alumina, molecular Sieves, kaolin, diatomaceous earth, carbon black or activated carbon.

12. A liquid fuel cell according to claim 11, wherein the adsorbing agent is carbon black or activated carbon, and whereby the liquid fuel is released therefrom when the non-fluid material binding a fuel in a non-fluidized state comes in contact with water under a heated condition.

13. A liquid fuel cell according to claim 6, wherein said non-fluid material is an agent which chemically reacts with the fuel to form salts thereof or polymers thereof that are in a solid form.

14. A liquid fuel cell according to claim 13, wherein the salts consist of solidified fuels selected from sodium formate, potassium formate, hydrazinium sulfate, lithium methylate, sodium methylate, potassium methylate, metaformaldehyde and paraformaldehyde.

15. A liquid fuel cell according to claim 14, wherein the solidified fuels are selected from the group consisting of metaformaldehyde and paraformaldehyde, and whereby the liquid fuel is released therefrom when the non-fluid material binding a fuel in a non-fluidized state comes in contact with water under a heated condition.

16. A liquid fuel cell according to claim 6, wherein the non-fluid material binding a fuel in a non-fluidized state is a non-fluid material binding a liquid fuel in the non-fluidized state.

17. A liquid fuel cell according to claim 16, wherein the liquid fuel is selected from the group consisting of methanol, formic acid, formalin and hydrazine.

18. A liquid fuel cell according to claim 6, wherein said anolyte or fuel chamber is filled with a fibrous substrate material.

* * * * *